United States Patent
Ma et al.

(10) Patent No.: US 9,429,427 B2
(45) Date of Patent: Aug. 30, 2016

(54) INDUCTIVE INERTIAL SENSOR ARCHITECTURE AND FABRICATION IN PACKAGING BUILD-UP LAYERS

(71) Applicants: Qing Ma, Saratoga, CA (US); Feras Eid, Chandler, AZ (US); Kevin Lin, Beaverton, OR (US); Johanna M. Swan, Scottsdale, AZ (US); Weng Hong Teh, Phoenix, AZ (US); Valluri R. Rao, Saratoga, CA (US)

(72) Inventors: Qing Ma, Saratoga, CA (US); Feras Eid, Chandler, AZ (US); Kevin Lin, Beaverton, OR (US); Johanna M. Swan, Scottsdale, AZ (US); Weng Hong Teh, Phoenix, AZ (US); Valluri R. Rao, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 13/720,876
(22) Filed: Dec. 19, 2012

(65) Prior Publication Data

US 2014/0165723 A1     Jun. 19, 2014

(51) Int. Cl.
    *G01C 19/00*     (2013.01)
    *G01C 19/56*     (2012.01)
    *G01C 19/5776*   (2012.01)

(52) U.S. Cl.
    CPC ........... *G01C 19/56* (2013.01); *G01C 19/5776* (2013.01)

(58) Field of Classification Search
    CPC .................................................. G01C 19/24
    USPC ............................ 73/504.03, 504.12, 514.32
    See application file for complete search history.

(56) References Cited

U.S. PATENT DOCUMENTS

| | | | |
|---|---|---|---|
| 3,875,502 A | * | 4/1975 | Neumaier .......... G01N 27/9033 324/241 |
| 5,698,784 A | * | 12/1997 | Hotelling ........... G01C 19/5607 73/504.16 |

(Continued)

FOREIGN PATENT DOCUMENTS

| | | |
|---|---|---|
| CN | 1334915 A | 2/2002 |
| CN | 1768247 A | 5/2006 |

(Continued)

OTHER PUBLICATIONS

Office Action for Related Counterpart Japanese Application No. 2014-556840 with English translation, mailed Jul. 28, 2015, 8 pages.
PCT Notification of Transmittal of the International Preliminary Report on Patentability from related PCT/US2013/045026, mailed Jan. 8, 2015, 9 pgs.
PCT International Preliminary Report on Patentability with Written Opinion for related PCT/US2013/046635, mailed Jul. 2, 2015, 7 pages.

(Continued)

*Primary Examiner* — Hezron E Williams
*Assistant Examiner* — Tarun Sinha
(74) *Attorney, Agent, or Firm* — Blakely, Sokoloff, Taylor & Zafman LLP

(57) ABSTRACT

This invention relates to inductive inertial sensors employing a magnetic drive and/or sense architecture. In embodiments, translational gyroscopes utilize a conductive coil made to vibrate in a first dimension as a function of a time varying current driven through the coil in the presence of a magnetic field. Sense coils register an inductance that varies as a function of an angular velocity in a second dimension. In embodiments, the vibrating coil causes first and second mutual inductances in the sense coils to deviate from each other as a function of the angular velocity. In embodiments, self-inductances associated with a pair of meandering coils vary as a function of an angular velocity in a second dimension. In embodiments, package build-up layers are utilized to fabricate the inductive inertial sensors, enabling package-level integrated inertial sensing advantageous in small form factor computing platforms, such as mobile devices.

17 Claims, 12 Drawing Sheets

(56) References Cited

U.S. PATENT DOCUMENTS

| | | | |
|---|---|---|---|
| 5,881,963 A * | 3/1999 | Hinkle | 242/378.3 |
| 5,883,779 A | 3/1999 | Catanescu et al. | |
| 6,982,859 B1 | 1/2006 | Whitney | |
| 7,741,723 B2 | 6/2010 | Uchida | |
| 7,745,892 B1 | 6/2010 | Ivanov et al. | |
| 2005/0013281 A1 | 1/2005 | Milton et al. | |
| 2005/0132814 A1 | 6/2005 | Satou et al. | |
| 2006/0042383 A1* | 3/2006 | Ogino | G01C 19/5719 73/504.12 |
| 2006/0066303 A1 | 3/2006 | Oohashi et al. | |
| 2006/0231921 A1 | 10/2006 | Van Kampen et al. | |
| 2007/0025092 A1 | 2/2007 | Lee et al. | |
| 2007/0151332 A1* | 7/2007 | Nagata | G01C 19/5712 73/65.01 |
| 2007/0177316 A1* | 8/2007 | Hotelling | G01C 19/5705 361/51 |
| 2008/0142606 A1 | 6/2008 | Wu | |
| 2008/0174781 A1 | 7/2008 | Berthold et al. | |
| 2009/0027748 A1 | 1/2009 | Sprague et al. | |
| 2009/0127590 A1 | 5/2009 | Shimada | |
| 2009/0294942 A1 | 12/2009 | Palmer et al. | |
| 2011/0067982 A1 | 3/2011 | Schmit et al. | |
| 2012/0120022 A1 | 5/2012 | Cheng et al. | |
| 2012/0160027 A1* | 6/2012 | Hsu | B81B 3/0086 73/504.08 |
| 2012/0161278 A1 | 6/2012 | Meyer et al. | |
| 2014/0000377 A1 | 1/2014 | Lin et al. | |
| 2014/0002178 A1 | 1/2014 | Teh et al. | |
| 2014/0076051 A1 | 3/2014 | Ma et al. | |
| 2014/0083858 A1 | 3/2014 | Teh et al. | |
| 2014/0165723 A1* | 6/2014 | Ma | G01C 19/5776 73/504.12 |
| 2014/0353827 A1 | 12/2014 | Liu et al. | |
| 2015/0048515 A1 | 2/2015 | Zhang et al. | |
| 2015/0183635 A1 | 7/2015 | Lee et al. | |

FOREIGN PATENT DOCUMENTS

| | | |
|---|---|---|
| EP | 1 004 882 B1 | 4/2008 |
| JP | 5-240874 | 9/1993 |
| JP | 06-350105 | 12/1994 |
| JP | 10-96631 | 4/1998 |
| JP | 2000-504106 | 4/2000 |
| JP | 2001-194153 | 7/2001 |
| JP | 2001-194153 A | 7/2001 |
| JP | 2005-159715 | 6/2005 |
| JP | 2006-170785 A | 6/2006 |
| JP | 2010-021210 | 1/2010 |
| KR | 10-0511926 B1 | 8/2005 |
| KR | 10-2008-0101010 A | 11/2008 |
| KR | 2010-0119889 | 11/2010 |
| TW | 463050 B | 11/2001 |

OTHER PUBLICATIONS

PCT Notification of Transmittal of the International Preliminary Report on Patentability from related PCT/US2013/044354, mailed Jan. 8, 2015, 6 pgs.

Taiwan Search Report for foreign counterpart Taiwan Patent Application No. 102121931, mailed Mar. 24, 2015, 1 page.

Related PCT Notification concerning Transmittal of International Preliminary Report on Patentability (Chapter I of the Patent Cooperation Treaty) for PCT Counterpart Application No. PCT/US2013/045026, 9 pgs., (Jan. 8, 2015).

Related PCT Notification concerning Transmittal of International Preliminary Report on Patentability (Chapter I of the Patent Cooperation Treaty) for PCT Counterpart Application No. PCT/US2013/044354, 6 pgs., (Jan. 8, 2015).

PCT/US2013/046635 Notification of Transmittal of the International Search Report and the Written Opinion of the International Searching Authority, or the Declaration, mailed Sep. 25, 2013, 12 pages.

Related Patent Application PCT/US2013/045026 Notification of Transmittal of the International Search Report and the Written Opinion of the International Searching Authority, or the Declaration, mailed Nov. 20, 2013, 12 pages.

Related Patent Application PCT/US2013/044354 Notification of Transmittal of the International Search Report and the Written Opinion of the International Searching Authority, or the Declaration, mailed Sep. 13, 2013, 9 pages.

Notice of Allowance from related U.S. Appl. No. 13/537,573, mailed Sep. 16, 2013, 8 pages.

Related U.S. Appl. No. 13/624,288, filed Sep. 21, 2012, titled "Heterogeneous Integration of Microfluidic Devices in Package Structures," 45 pages.

Related U.S. Appl. No. 13/618,003, filed Sep. 14, 2012, titled "Accelerometer and Method of Making the Same," 29 pages.

Official Action from the German Patent Office dated Jan. 19, 2016 for German Patent Application No. 112013000325.2 and English Translation thereof.

Office Action from the Japanese Patent Office dated Mar. 22, 2016 for Japanese Patent Application No. 2014-556840 and English Translation thereof.

Office Action and Taiwan Search Report from foreign counterpart Taiwan Patent Application No. 102142051, mailed Mar. 19, 2015, 7 pages.

First Office Action from the Chinese Patent Office for Chinese Patent Application No. 201380004607.0 dated Apr. 6, 2016 and English Translation thereof.

Office Action from the Chinese Patent Office for Chinese Patent Application No. 201380004607.0 dated Apr. 6, 2016 and English Translation thereof.

* cited by examiner

```
┌─────────────────────────────────────────────┐
│ DRIVE A TIME VARYING CURRENT THROUGH COIL   │
│ DISPOSED OVER MAGNET THAT VIBRATES THE      │
│ FIRST COIL IN A FIRST DIMENSION RELATIVE    │
│ TO THE IC PACKAGE                           │
│                    505                      │
└─────────────────────────────────────────────┘
                      │
                      ▼
┌─────────────────────────────────────────────┐
│ GENERATE FIRST AND SECOND TIME VARYING      │
│ VOLTAGE SIGNALS WITH A PAIR OF SENSE COILS  │
│ THROUGH MUTUAL INDUCTION, THE FIRST AND     │
│ SECOND TIME VARYING VOLTAGE SIGNALS         │
│ DEVIATING FROM EACH OTHER AS A FUNCTION     │
│ OF AN ANGULAR VELOCITY IN A SECOND          │
│ DIMENSION, ORTHOGONAL TO THE FIRST          │
│ DIMENSION                                   │
│                    510                      │
└─────────────────────────────────────────────┘
                      │
                      ▼
┌─────────────────────────────────────────────┐
│ DETERMINE YAW, PITCH, OR ROLL OF DEVICE     │
│ BASED ON THE FIRST AND SECOND TIME          │
│ VARYING VOLTAGE SIGNALS                     │
│                    515                      │
└─────────────────────────────────────────────┘
```

FIG. 5

```
┌─────────────────────────────────────────────┐
│ DRIVE A TIME VARYING CURRENT THROUGH A COIL VIA FIRST │
│ PAIR OF CONDUCTIVE ANCHORS, THE COIL DISPOSED WITHIN │
│ A MAGNETIC FIELD OF A MAGNET TO VIBRATE THE COIL IN │
│ A FIRST DIMENSION RELATIVE TO THE IC PACKAGE │
│ 605 │
└─────────────────────────────────────────────┘
                      ↓
┌─────────────────────────────────────────────┐
│ MEASURE SENSE SIGNAL ACROSS A SECOND PAIR OF │
│ CONDUCTIVE COIL ANCHORS TO DETERMINE A RESONANCE │
│ FREQUENCY OF AN LC LOOP COMPRISING A PORTION OF │
│ THE COIL AND A CAPACITOR COUPLED ACROSS THE │
│ SECOND PAIR OF COIL ANCHORS │
│ 610 │
└─────────────────────────────────────────────┘
                      ↓
┌─────────────────────────────────────────────┐
│ DETERMINE A SELF-INDUCTANCE OF SPRINGS WITHIN THE │
│ SECOND PAIR OF CONDUCTIVE COIL ANCHORS BASED ON THE │
│ RESONANCE FREQUENCY │
│ 615 │
└─────────────────────────────────────────────┘
                      ↓
┌─────────────────────────────────────────────┐
│ DETERMINE AN ANGULAR VELOCITY IN A SECOND DIMENSION, │
│ ORTHOGONAL TO THE FIRST DIMENSION BASED ON THE SELF │
│ INDUCTANCE OF SPRINGS │
│ 620 │
└─────────────────────────────────────────────┘
```

FIG. 6

INDUCTIVE INERTIAL SENSOR ARCHITECTURE AND FABRICATION IN PACKAGING BUILD-UP LAYERS

TECHNICAL FIELD

The present invention generally relates to integrated inertial sensors and more particularly to inductive gyroscopes.

BACKGROUND

Inertial sensors are useful in many devices, such as consumer mobile devices (e.g., smartphone, game controller, etc.). Gyroscopes are used as sensors of angular velocity or angular acceleration generated by rotation of a movable body and may be formed using MEMS manufacturing processes, which generally utilize semiconductor fabrication techniques. MEMS gyroscopes may include a suspended proof mass driven to mechanically vibrate in a first dimension relative to a support with the Coriolis effect coupling energy from the vibrating mass to an orthogonal (sensed) dimension when the gyroscope (disposed in the mobile device) experiences a rotation. A rotation rate (e.g., rad/sec) may then be determined. One or more such gyroscopes, when embedded within a mobile device, may then be utilized to characterize angles of rotation about a three dimensional axis (e.g., yaw, pitch, roll).

Many MEMS gyroscopes rely on a change in capacitance between the proof mass and the support resulting from the Coriolis force, measured, for example, by converting the magnitude of the capacitance to a voltage. As such, it is desirable to make capacitive coupling between the suspended proof mass and the support large by minimizing the physical spacing between surfaces of the proof mass and the support. For example, gap spacing between capacitively coupled faces of a suspended proof mass and the support may be on the orders of nanometers for the sake of greater sensor sensitivity. However, such dimensions rely on advanced thin film techniques, (e.g., conformal depositions, anisotropic plasma etches, etc.), necessitating fabrication of such inertial sensors as discrete devices, typically employing a silicon (e.g., MEMS) chip that is separated from a processor or other integrated circuit (IC) chip handling logic functions in the mobile device. Thus, integration of inertial sensors with other ICs is typically board-level.

Inertial sensors that can be integrated with ICs within a same package in a manner that does not require the package to be of a thickness significantly greater than it would otherwise are therefore advantageous, particularly for mobile device form factors.

BRIEF DESCRIPTION OF THE DRAWINGS

Embodiments of the present invention are illustrated by way of example, and not limitation, in the figures of the accompanying drawings in which:

FIGS. 5 and 6 are flow diagrams illustrating methods of determining an angular rate of rotation with an inductive gyroscope, in accordance with embodiments of the invention;

DETAILED DESCRIPTION

Figure 1A:
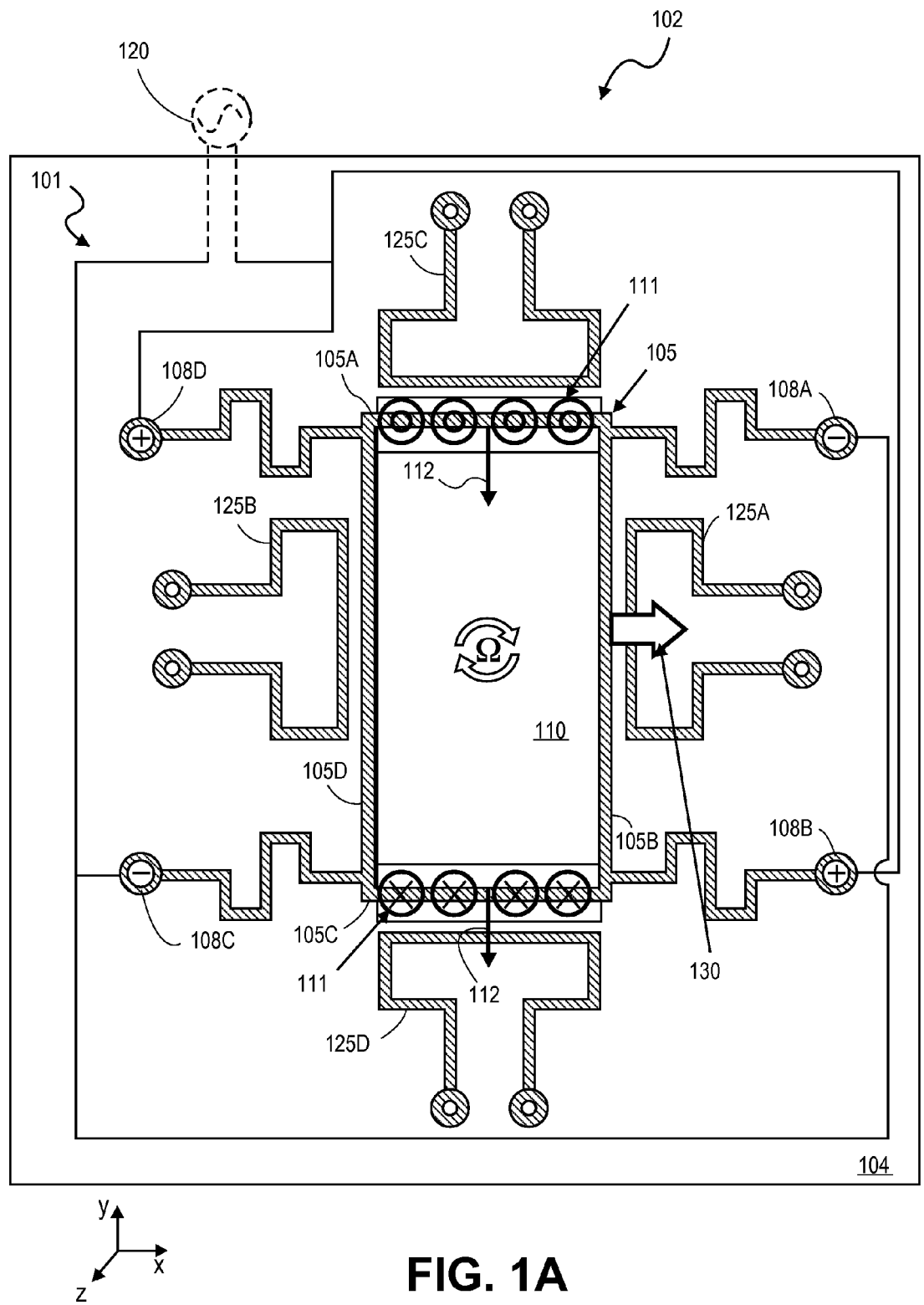
FIG. 1A is a plan view schematic of an inductive gyroscope, in accordance with an embodiment of the invention.

Described herein are embodiments of inductive gyroscopes employing a magnetic drive and/or sense architecture amenable to fabrication in packaging build-up layers. In the following description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment," or "in one embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention, or only one embodiment. Furthermore, the particular features, structures, functions, or characteristics may be combined in any suitable manner in one or more embodiments. For example, a first embodiment may be combined with a second embodiment anywhere the two embodiments are not specifically denoted as being mutually exclusive.

The term "coupled" is used herein to describe functional or structural relationships between components. "Coupled" may be used to indicated that two or more elements are in either direct or indirect (with other intervening elements between them or through the medium) mechanical, acoustic, optical, or electrical contact with each other, and/or that the two or more elements co-operate or interact with each other (e.g., as in a cause and effect relationship).

The terms "over," "under," "between," and "on" as used herein refer to a relative position of one component or material layer with respect to other components or layers where such physical relationships are noteworthy for mechanical components in the context of an assembly, or in the context of material layers of a micromachined stack. One layer (component) disposed over or under another layer (component) may be directly in contact with the other layer (component) or may have one or more intervening layers (components). Moreover, one layer (component) disposed between two layers (components) may be directly in contact with the two layers (components) or may have one or more intervening layers (components). In contrast, a first layer (component) "on" a second layer (component) is in direct contact with that second layer (component).

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the gyroscopes described herein employ a magnetic drive and/or sense architecture which does not require the sub-micron feature sizes typical of gyroscopes employing capacitive drive and/or sense architectures. As used herein a "magnetic drive" entails inducing a time varying current within a main coil that is anchored in a manner to permit a controlled directional vibration of the main coil as a result of passage of the current in the coil through a magnetic field. A "magnetic sense" entails sensing a mutual or self inductance that varies as a result of the displacement of the coil induced by an angular velocity. As such, the main coil serves as a movable proof mass and also serves the additional function of carrying one or more time varying currents through one or more magnetic fields.

It has been found by the inventors that inductive inertial sensor architectures can be implemented with critical feature sizes significantly larger than those needed for capacitive drive/sense designs while achieving a rotation measurement sensitivity sufficient for many consumer products. As such, fabrication techniques, such as but not limited to techniques employed in the packaging of an IC chip (e.g., organic dielectric build-up layers), may be employed for fabrication of the sensors so that they may be integrated with the IC at the package-level to achieve an ultra-compact form factor not possible with capacitive sense/drive systems. Furthermore, embodiments of inductive gyroscopes described herein have been found to require very little power. For example, in one embodiment a main coil may be driven with a current on the order of 1-10 mA at a drive voltage on the order of those typical supplied to mobile consumer devices (e.g., 1.5-3.3V).

FIG. 1A is a plan view schematic for an inductive gyroscope 101, in accordance with an embodiment of the invention. As shown, a drive coil 105 is disposed over a substrate 104. The drive coil 105 is a conductive material, such as a metallization layer (e.g., Cu), anchored to the substrate 104 by conductive anchors 108A, 108B, 108C, and 108D (e.g., Cu vias). In the illustrated embodiment, the drive coil 105 is substantially parallel to the plane of the substrate 104. The substrate 104 may be any conventional material in the art of micro-electro-mechanical systems (MEMS) or microelectronics packaging, such as, but not limited to thin silicon, glasses, epoxies, metals, dielectric films, organic films, etc. In the exemplary embodiment the drive coil 105 is substantially planar with the plane parallel to a plane of the substrate 104. The exemplary drive coil 105 includes for substantially orthogonal segments 105A, 105B, 105C, and 105D forming one continuous conductive trace loop.

The drive coil 105 is disposed over a magnet 110 to be within a magnetic (B) field 111 of the magnet 110. In the exemplary embodiment the magnet 110 is a permanent magnetic disposed over the substrate 104. In the exemplary embodiment, the magnet 110 is a discrete, bulk magnetic material, such as, but not limited to Co alloys. For the inductive gyroscope 101, the magnet 110 is such that the magnetic field 111 is perpendicular to the plane of the substrate 104 with the field 111 emanating away from, and returning to the substrate 104 at the north and south poles, respectively, as illustrated.

A drive signal generator 120 is drawn in dashed line in FIG. 1A in recognition that the generator 120 may, or may not, be disposed on the substrate 104. As one example, the drive signal generator 120 may be a provided by an IC disposed on a second substrate, but also contained within packaging layers utilized to form the inductive gyroscope 101, as described further elsewhere herein. The drive signal generator 120 is to drive a time varying current (e.g., sinusoidal) through the drive coil 105 via at least one pair of the conductive anchors 108A, 108B, 108C, and 108D. In the illustrated embodiment, a first pair of the conductive anchors (e.g., 108A, 108D), corresponding to a first dimension, are coupled to the two terminals of the generator 120, while a second pair of the conductive anchors (e.g., 108B, 108C), corresponding to a second, orthogonal dimension, are similarly configured and in parallel with the first pair.

During operation, the coil 105 conducts the time varying current which passes through the magnetic field 111 (e.g., along drive coil segments 105A and 105C), generating a magnetic force 112 which causes the drive coil 105 to vibrate in a first dimension (e.g., the y-dimension) relative to the substrate 104. In advantageous embodiments, the coil 105 is driven by a current at a frequency near the resonance frequency for largest Coriolis effect (force) at a given drive power. When an external angular rotation occurs about an axis of rotation along a second dimension, perpendicular to the first dimension along which the coil 105 is oscillating, the Coriolis force causes the vibrating drive coil to be displaced along a third dimension, orthogonal to the first and second dimensions. Thus, for the exemplary inductive gyroscope 101 where the oscillation is parallel to the substrate 104 (along the in-plane dimension y), an external rotation about an axis perpendicular to the plane of the substrate 104 (i.e., an angular velocity $\Omega$ is in the z-dimension), induces a Coriolis force 130 that causes the drive coil 105 to move in the x-dimension.

In embodiments, one or more sense coils are employed to register a mutual inductance induced by displacement of the drive coil 105. As shown in FIG. 1A, a first pair of sense coils 125A, and 125B are disposed on opposite side of the drive coil 105 (e.g, parallel to the drive coil segments 105B and 105D, respectively). The sense coils 125A, 125B also entail metallized traces (e.g., Cu), and may be planar with the drive coil 105, but are affixed to the substrate 104, or there above (i.e., not released structures), and therefore do not vibrate. In the exemplary embodiment depicted in FIG. 1A, the sense coils 125A and 125B are in the same plane as the drive coil 105 (i.e., a same level of metallization).

With sense coils 125A and 125B having segments substantially parallel to the drive coil segments 105B and 105D, respectively, mutual inductance within the sense coils 125A and 125B may vary as a function of drive coil displacement in both the x and y dimensions. Because of symmetry of the sense coils 125A and 125B with respect to the drive coil 105 in the y-dimension (e.g., same y-dimension coil lengths, same x-dimension spacing between the drive and sense coils in the absence of external rotation), both the sense coils 125A and 125B will register approximately the same mutual inductance fluctuation as a function of drive coil displacement in the y-dimension. However, for displacements of the drive coil 105 in the x-dimension, the sense coils 125A and 125B will register first and second mutual inductances, respectively, that deviate from each other as a function of the angular velocity. As such, mutual inductance in the sense coils 125A, 125B registered in response to a displacement of the drive coil in the x-dimension is greater than any minute mutual inductance differential registered by the sense coils 125A and 125B in response to a y-displacement of the drive coil. The displacement of the coil in the x-dimension resulting from the external rotation with angular velocity Ω creates a time dependent flux across the sense coils 125A and 125B, which in turn induces a voltage across each sense coil 125A and 125B that is correlated to the angular velocity a Through signal processing, a differential signal derived from the voltage signals registered by each of the sense coils 125A and 125B is then conditioned for sensing and quantification of the angular velocity a Ω.

As further shown in FIG. 1A, additional sense coils 125C and 125D are disposed substantially parallel to the drive coil segments 105A and 105B. Where the orientation of the magnet 110 creates the magnetic force 112 through the drive coil segments 105A and 105B, the sense coils 125A and 125B provide the asymmetry responsive to the Coriolis effect. However, the second pair of sense coils 125C, 125D may be utilized in combination with, or in the alternative to, the sense coil pair 125A, 125B, for embodiments with different magnet orientation(s), as further illustrated in FIG. 1B.

Figure 1B:
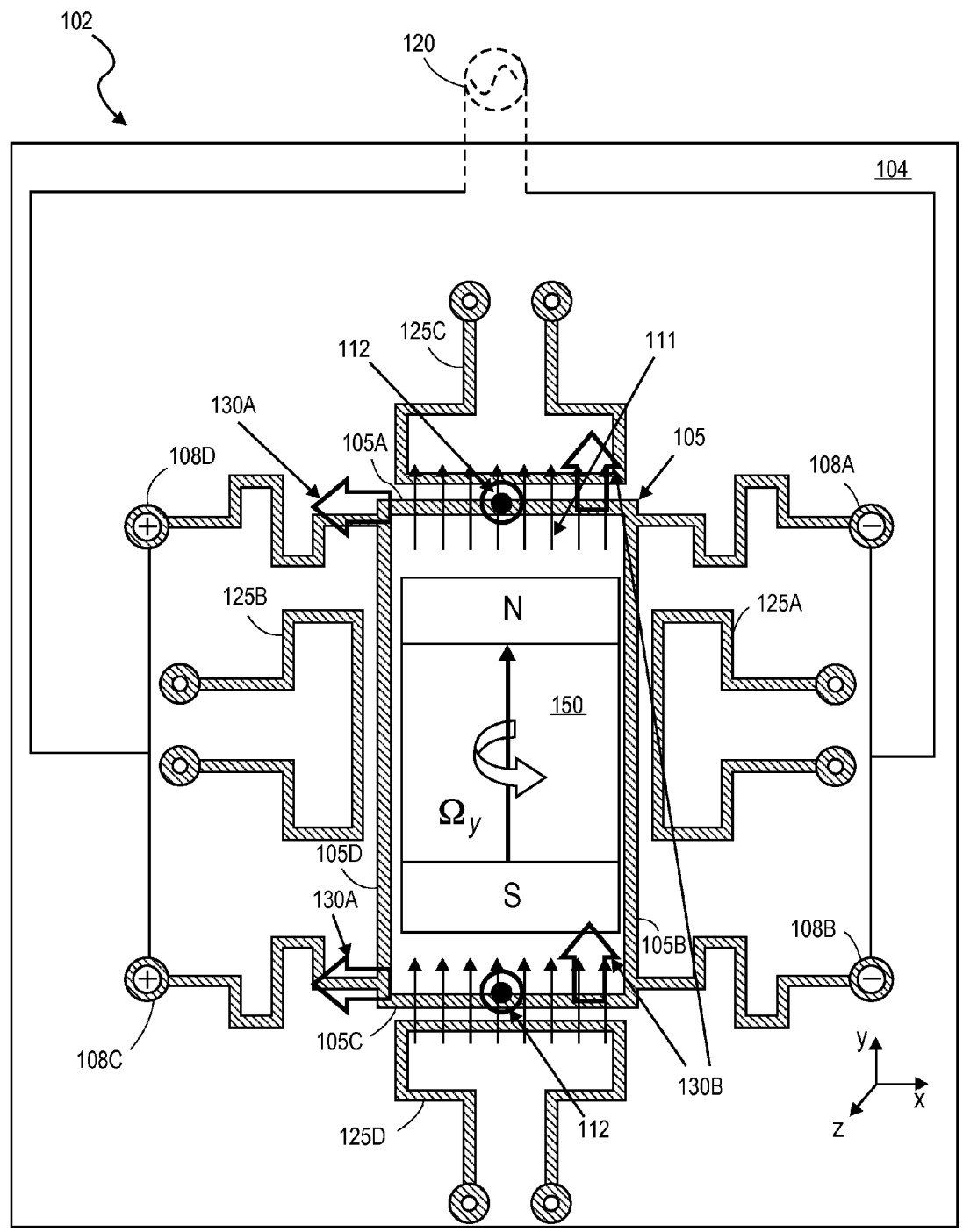
FIG. 1B is a plan view schematic of an inductive gyroscope, in accordance with an embodiment of the invention.

FIG. 1B is a plan view schematic for an inductive gyroscope 102, in accordance with an embodiment of the invention. For the gyroscope 102, structural features having the same reference number as in the gyroscope 101 represent the same component or feature introduced in the context of FIG. 1A. Generally, the gyroscope 102 is trampoline gyroscope operating on the same principles as those described for the orthogonal translational gyroscope 101. The architectures of the gyroscopes 101 and 102 are substantially the same with the exception that the magnet 150 is oriented to have N-S poles as illustrated in FIG. 1B. The magnetic field 111 is then parallel to the plane of the substrate 104.

With the magnetic field 111 oriented along the y-dimension, a sinusoidal drive current applied to the drive coil 105 during operation (e.g., between the anchors 108D and 108A, across the drive coil segment 105A and similarly between the anchors 108C and 108B, across the drive coil segment 105C) results in the magnetic force 112 being perpendicular to the substrate 104 (out of the plane) and vibrating the drive coil 105 perpendicularly to the plane of the substrate 104 (i.e., trampoline motion in the z-dimension). For this embodiment as well, vibration of the drive coil 105 at or near the resonance frequency of the drive coil 105 is advantageous.

While displacement in the z-dimension is symmetric to all sense coils, displacement in the y-dimension is asymmetrical to the sense coils 125C and 125D while being symmetrical to the sense coils 125A, 125B, and displacement in the x-dimension is asymmetrical to the sense coils 125A and 125B while being symmetrical to the sense coils 125C, 125D. As such, the gyroscope 102 is sensitive to angular velocities in both the y-dimension and x-dimension (i.e., in-plane dimensions). For example, as shown in FIG. 1B, an angular velocity in the y-dimension ($\Omega_y$) induces a corresponding Coriolis force 130A, in which case a mutual inductance differential is registered between the sense coils 125A and 125B. Similarly, an angular velocity in the x-dimension ($\Omega_x$, not shown in the figure for clarity) induces a corresponding Coriolis force 130B, in which case a mutual inductance differential is registered between the sense coils 125C and 125D. For the gyroscope 102 therefore, the two pairs of sense coils provide a basis for determining orthogonal in-plane angular velocities, and when combined with the gyroscope 101 on the same substrate 104, as illustrated by the FIGS. 1A and 1B, rotation/angular velocity about all three dimensions can be sensed and quantified.

Figure 1C:
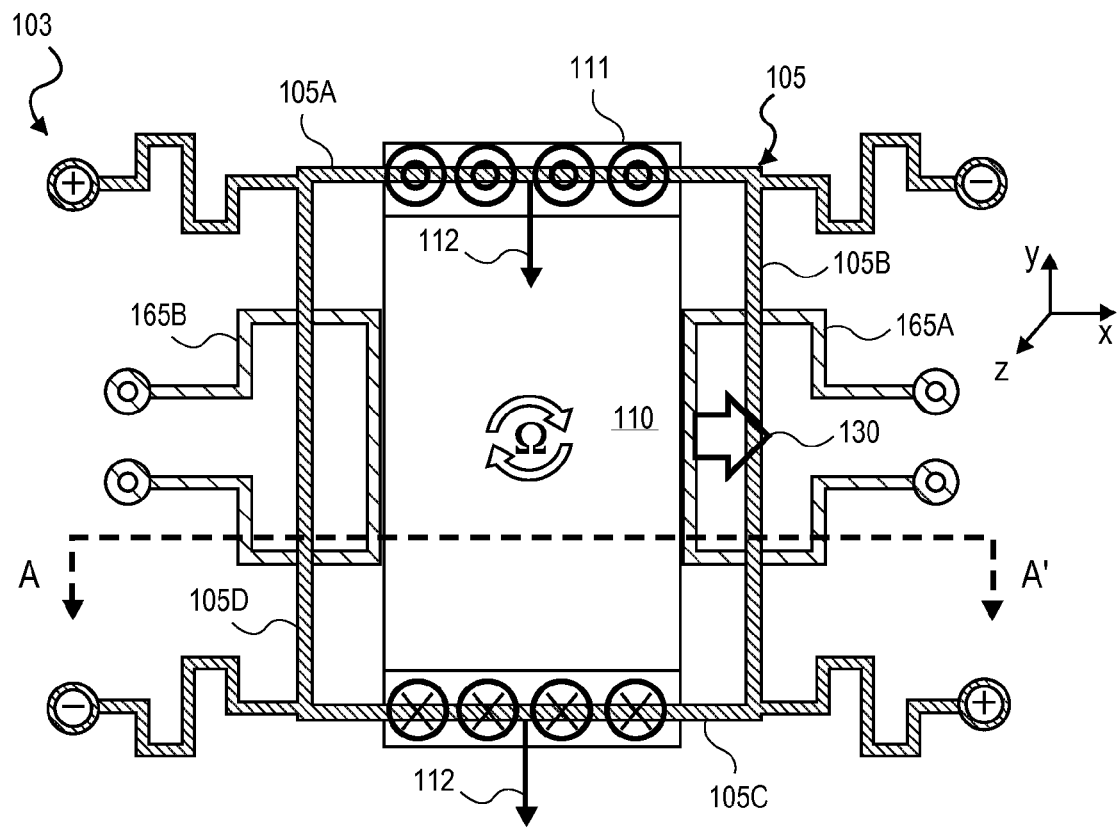
FIG. 1C is a plan view schematic of an inductive gyroscope, in accordance with an embodiment of the invention.
Figure 1D:
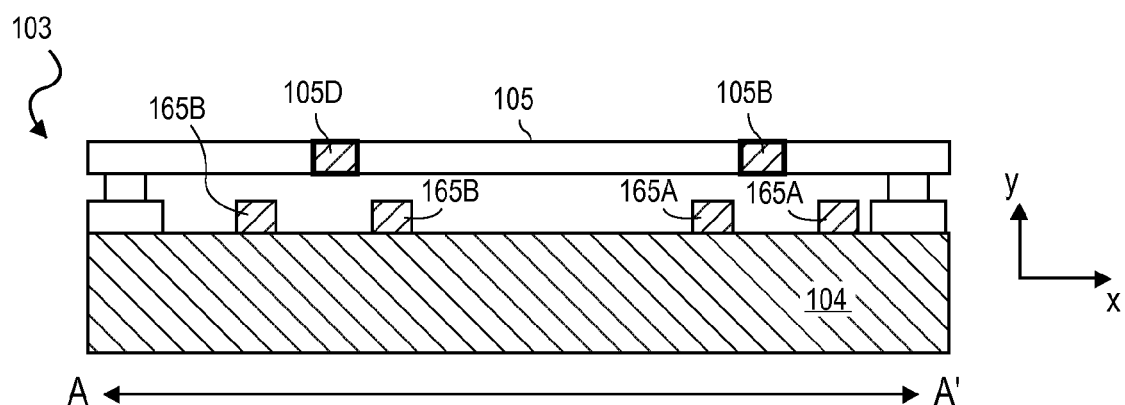
FIG. 1D is a cross-sectional view of the inductive gyroscope in FIG. 1C, in accordance with an embodiment of the invention.
Figure 1E:
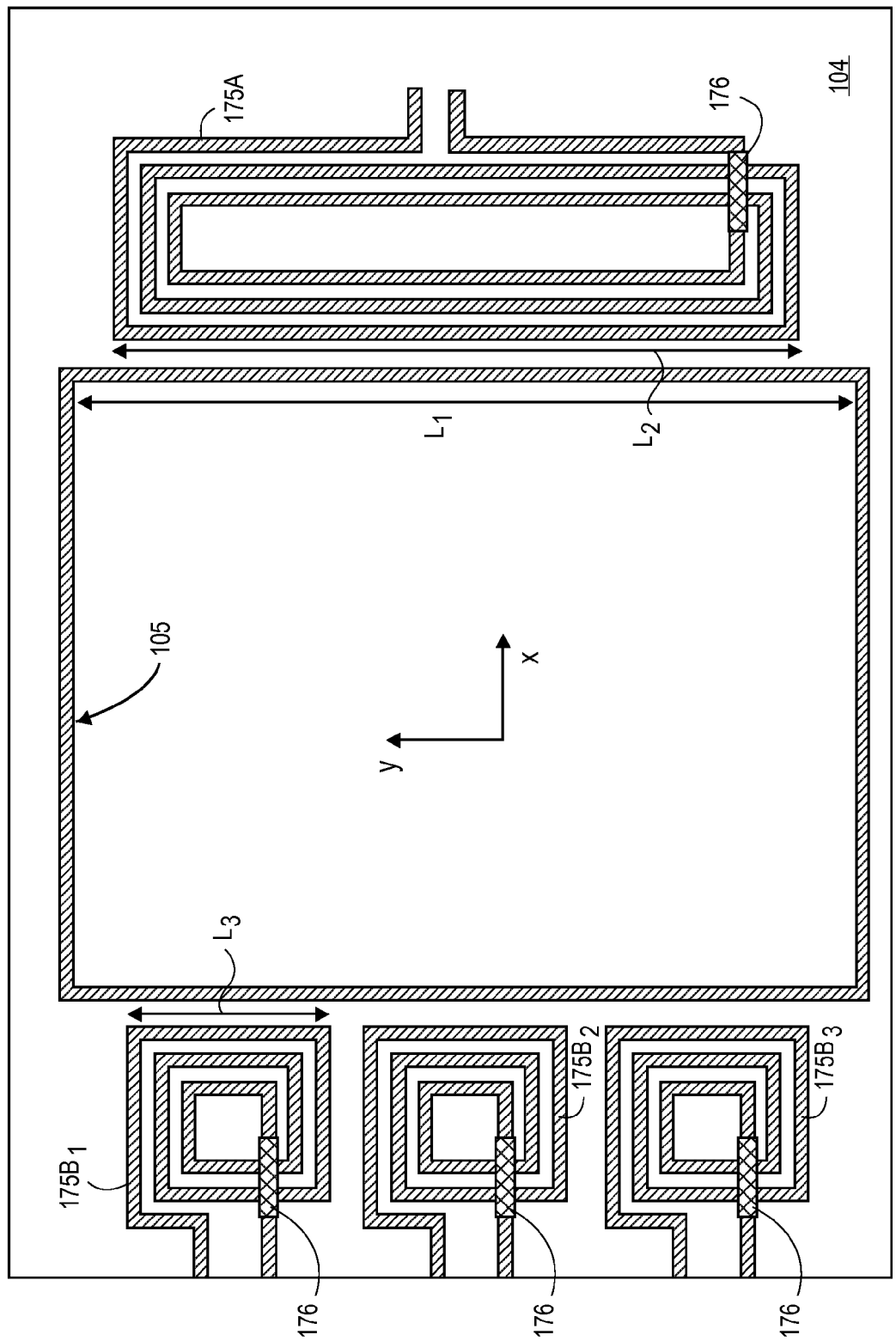
FIG. 1E is a plan view schematic of exemplary inductive gyroscope sense coil architectures, in accordance with embodiments of the invention.

While the gyroscopes 101 and 102 provide sufficient measurement sensitivity for many applications (e.g., at least 0.5 rads/sec), the signal generated by the sense coils depicted in FIGS. 1A and 1B may be strengthened in various ways for greater sensitivity (e.g., ~3x), and exemplary techniques are illustrated in FIGS. 1C-1E. FIG. 1C is a plan view schematic of an inductive gyroscope 103, in accordance with an embodiment of the invention. Generally, the gyroscope 103 is substantially identical to the gyroscope 101 (with reference numbers carried through for like components) except the sense coils are disposed out of the plane of the drive coil 105. This feature is further illustrated in FIG. 1D, which is a cross-sectional view of inductive gyroscope 103 along the A-A' line visible in FIG. 1C, in accordance with an embodiment of the invention. As shown in FIGS. 1C and 1D, the sense coils 165A and 165B are disposed directly on the substrate 104 with the drive coil 105 (e.g., segments 105B and 105D) disposed over the plane of the sense coils 165A, 165B. With the sense coils having one or more turns in a plane parallel to the substrate 104, but not in the same plane as the drive coil 105, the sense coil may be centered under (or over) the drive coil in both the x-dimension and y-dimension. As such, the induced magnetic flux on both sides of the drive coil should be equal and opposite, so that positive induced EMF on one side of the drive coil cancels the negative induced EMF on the other side of the drive coil for no net EMF induced in the symmetric solution when no angular velocity is present. The presence of angular velocity displaces the drive coil and breaks the symmetry, which results in a net EMF that can be sensed. As such, the sensed signals are a stronger function of the angular velocity. For these embodiments, processing of the sense signal can be simplified, and greater measurement sensitivity achieved. Notably, while the gyroscope 103 illustrates this technique in the context of orthogonal translation, it is equally applicable to trampoline gyroscopes (e.g., gyroscope 102).

FIG. 1E is a plan view schematic of exemplary inductive gyroscope sense coil architectures, in accordance with embodiments of the invention. The sense coil structures may be applied to any of the inductive gyroscope embodiments described herein (e.g., FIGS. 1A-1D). As described elsewhere herein, the drive coil 105 is disposed in a plane substantially parallel to the substrate 104. In the embodiments illustrated in FIG. 1E, the sense coils have a plurality of turns. With a plurality of turns, the turn ratio acts to step up the voltage induced in the sense coils. In the exemplary spiral coil embodiment, three turns are achieved within a single metallization level (plane). A second metallization level 176 is then only employed for routing over (under) the spiral. In further embodiments, lengths of the sense coil segments parallel to segments of the drive coil may be increased (maximized). For example, the sense coil 175A has a y-dimension length $L_2$ that is at least 90% of the y-dimension length $L_1$ of the drive coil 105. In another embodiment also illustrated by FIG. 1E, a plurality of sense coils (e.g., $175B_1$, $175B_2$, and $175B_3$) of smaller dimension (e.g., $L_3$) are disposed along the length (e.g., $L_1$) of the drive coil 105. The sense coils $175B_1$, $175B_2$, and $175B_3$ may then be connected in series. Notably, two or more of the architectures described in the context of FIGS. 1C-1E may be combined. For example, spiraled sense coils may be disposed out of the plane of the drive coil such that only the routing jumper is in the same plane as the drive coil.

Figure 2A:
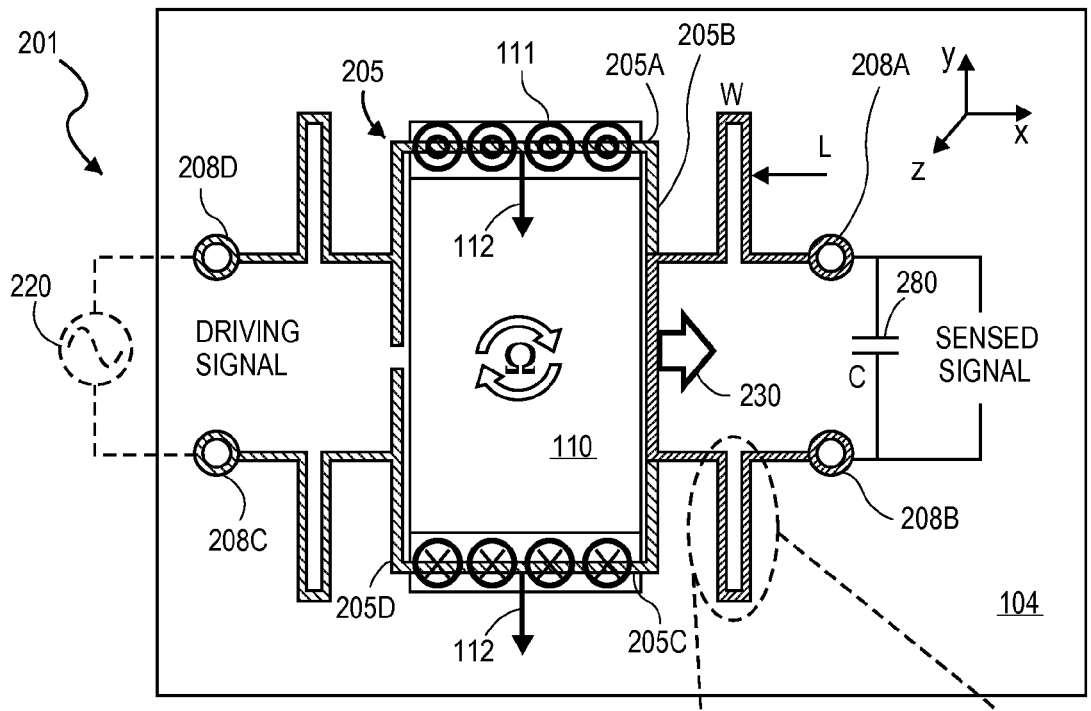
FIG. 2A is a plan view schematic of an inductive gyroscope, in accordance with an embodiment of the invention.

In embodiments, self-inductance rather than mutual inductance is utilized for determination of an angular velocity. FIG. 2A is a plan view schematic for an inductive gyroscope 201, in accordance with an embodiment of the invention. As shown in FIG. 2A, a conductive coil 205 is anchored to the substrate 104 by conductive anchors 208A, 208B, 208C, and 208D. The geometry of the coil 205 may be substantially as described for the coil 105 (e.g., parallel to the plane of the substrate 104, etc.). The coil 205 is disposed over the magnet 110 substantially as described for the gyroscope 101, with the magnetic field again perpendicular to the plane of substrate (out of the plane proximate to the coil segment 205A and into the plane proximate to the coil segment 205C). The sinusoidal drive signal (e.g., supply by the generator 220) is applied through a first pair of the anchors, 208C and 208D defining terminals of a drive circuit associated with the coil 205. The drive signal results in a magnetic force 112 in the y-dimension causing the coil 205 to vibrate in the y-dimension.

Instead of employing secondary coils, as for the gyroscopes 101 and 102, in the gyroscope 201 the second pair of conductive coils connected to anchors 208A, 208B are employed as coils in a sense circuit that further includes the portion of the coil 205 disposed between the anchors 208A, 208B (e.g, majority of segment 205B identified by separate shade lines in FIG. 2A). The anchors 208A and 208B, being taps off the coil 205, are connected to narrow rectangle spring regions to facilitate coil extension and compression due to the Coriolis force 230. In the example shown, the extension and compression, like the Coriolis force, are in the x-dimension, in response to an angular velocity in the z-dimension ($\Omega$). As illustrated, the springs have at least two segments with length L in the y-dimension that are joined by a third segment of width W in the x-dimension. The springs therefore are themselves coils capable of registering self inductances. Those self inductances vary as a function of changes in the coils' geometry as the narrow rectangle spring region compresses and extends to accommodate displacement of the coil 205 due to the Coriolis force 230. The spring deformation is further depicted in FIG. 2B, which is an expanded view of the spring segments connected to the anchor 208B, in accordance with an embodiment of the invention. As such, self-inductances of the sense circuit coils vary as a function of an angular velocity in the z-dimension ($\Omega$).

As further illustrated in FIG. 2A, a capacitor 280 is connected across the anchors 208A and 208B and forms, together with the springs, an LC loop having a resonant frequency that varies as a function of the self inductance. With the capacitor 280 being of a fixed, predetermined value (e.g., on the order of 1 nF), a signal is generated across the terminals 208A and 208B and may be sensed to determine the resonance frequency of the LC circuit, which is directly related to the self-inductance change due to the spring region compression and extension.

Figure 2B:
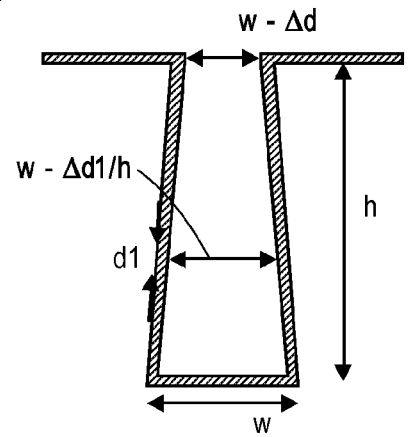
FIG. 2B is an expanded view spring segments in an anchor of a coil in the inductive gyroscope of FIG. 2A, in accordance with an embodiment of the invention.
Figure 2C:
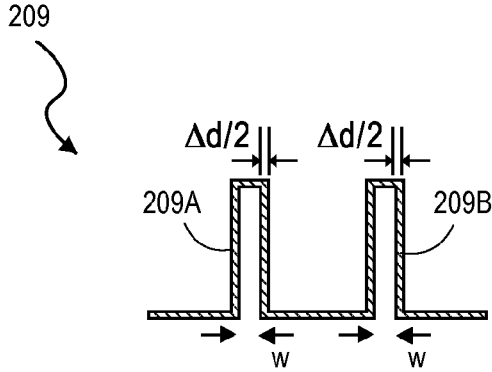
FIG. 2C is a plan view schematic of an exemplary multi-spring anchor of a coil for the inductive gyroscope of FIG. 2A, in accordance with an embodiment of the invention.

Similar to the multi-turn sense coils depicted in FIG. 1E, the anchor coils in the gyroscope 201 may have a plurality of parallel spring segments. For example, FIG. 2C is a plan view schematic of an exemplary multi-spring anchor 209, in accordance with an embodiment of the invention. The multi-spring anchor 209 may be employed in embodiments of the the gyroscope 201, for example, for improved linearity between inductance and $\Delta d$ associated with strain in members 209A, 209B (as illustrated in FIG. 2B).

Generally, the gyroscope embodiments described in the context of FIGS. 1A-2E may be fabricated using any conventional microelectronic processing techniques including front-end semiconductor-based processes such as nanolithography, and thin film vapor deposition, etc. While such techniques are ubiquitous in MEMS technology and would allow sub-micron feature dimensions (e.g., gaps between coils) for highly sensitive sensors, in the exemplary embodiments back-end packaging-based processes, such as film lamination and plating are utilized. Build-up techniques advantageously enable a gyroscope to be integrated into the packaging of a host-IC, such as, but not limited to, a sense signal processor, and/or sense signal amplifier, and/or drive signal generator. Because the magnetic drive/sense architecture exemplified by the embodiments described are operable with the coils spaced apart by greater distances than possible for capacitive gyroscope architectures, back-end packaging-based processes can be utilized whereas capacitive designs offer sensitivity only when fabricated with gap dimensions possible in front-end semiconductor chip processing. In one advantageous embodiment, inductive gyroscopes, such as, but not limited to those described in detail elsewhere herein, may be fabricated with bumpless build-up layer (BBUL) or general substrate processing technology. BBUL and substrate processing technology generally employs Ajinomoto build-up film (ABF) layers (or other similar organic dielectric materials) laminated together with electroplated copper planes there between. BBUL embedded packaging technology is particularly advantageous for mobile chip packaging technology, as well as other applications where smallest form factor is desired due to the die-embedding nature of BBUL within the package (which eliminates z-height budget consumption by the Si chip). Thus, with the exemplary approaches described herein a super-thin form factor of BBUL may be retained, and costs associated with separately fabricated and assembled inertial sensors may be avoided.

Figure 3:
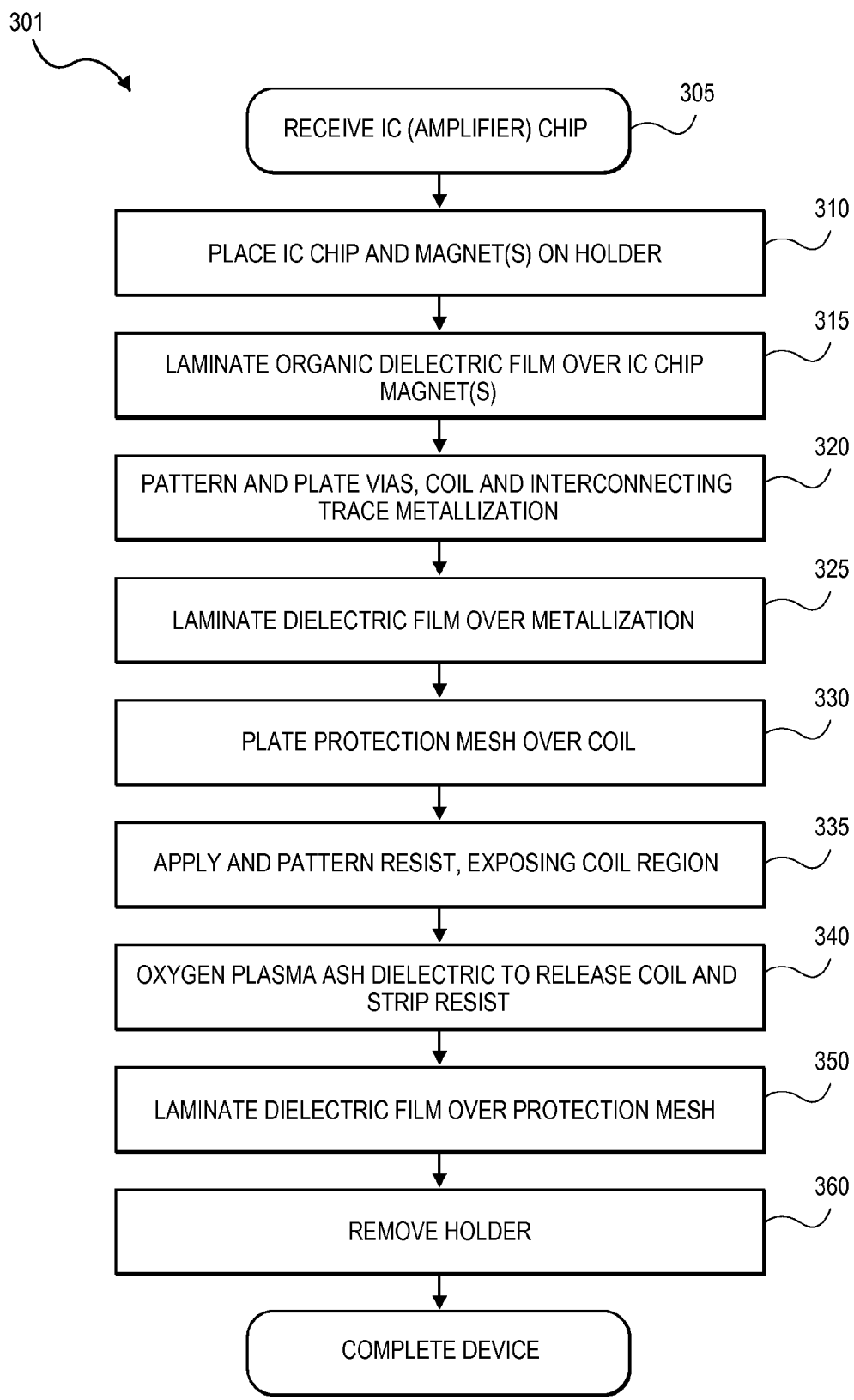
FIG. 3 is a flow diagram illustrating a method of fabricating an inductive gyroscope in IC package build-up layers, in accordance with embodiments of the invention.

FIG. 3 is a flow diagram illustrating a BBUL method 301 for fabricating an inductive gyroscope in IC package build-up layers, in accordance with embodiments of the invention. FIGS. 4A, 4B, 4C, 4D, 4E, 4F, 4G, 4H, and 4I are cross-sectional schematics of structures as an inductive gyroscope is integrated with an IC following the method 301, in accordance with an embodiment.

Method 301 begins with receiving an IC chip at operation 305. The IC chip may include one or more of: circuitry to amplify an inertial sense signal (e.g., a differential voltage signal generated by a pair of sense coils); circuitry to otherwise process an inertial sense signal (e.g., PLL circuitry, ADC circuitry, etc.); circuitry to generate a drive signal (e.g., AC reference generator, etc.); or circuitry to calculate a rotation based on an inertial sense signal (e.g., logic processor configured to calculate Euler angles relating to at least one of yaw, pitch, and roll).

Figure 4A:
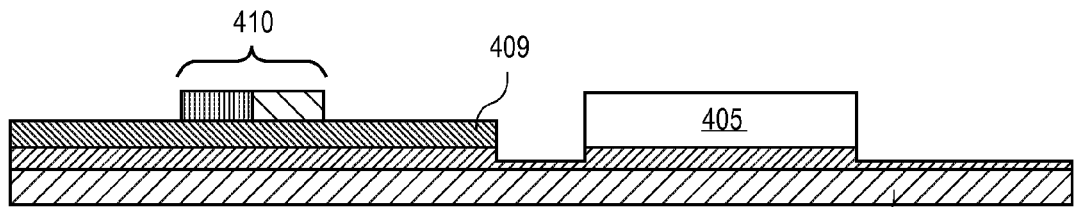
FIGS. 4A, 4B, 4C, 4D, 4E, 4F, 4G, 4H, and 4I are cross-sectional schematics of structures as an inertial sensor is integrated with an IC following the method illustrated in FIG. 3, in accordance with an embodiment.
Figure 4B:
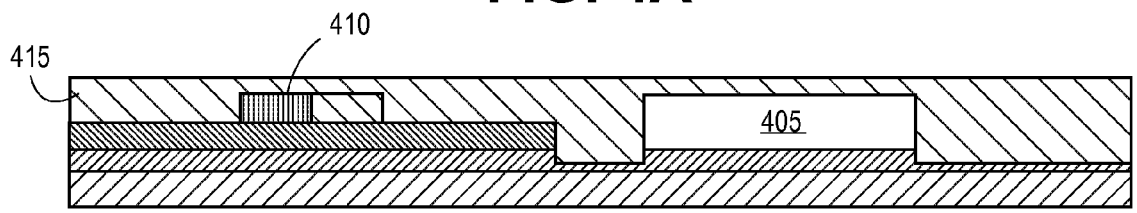
Figure 4C:
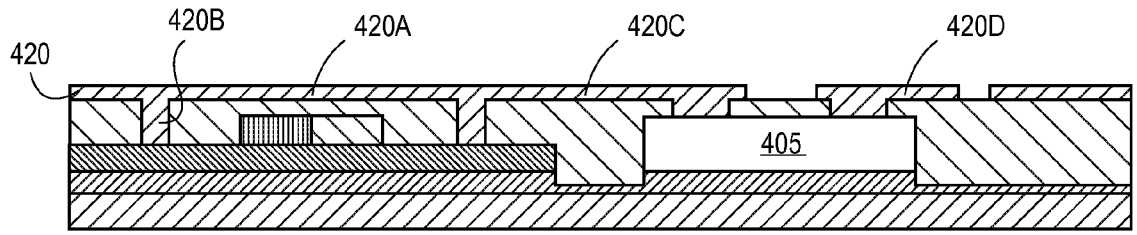
Figure 4D:
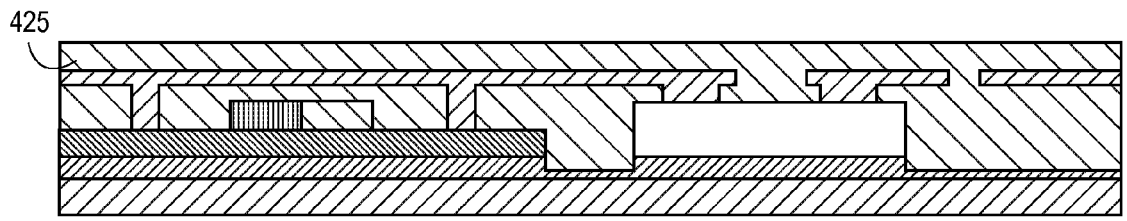
Figure 4E:
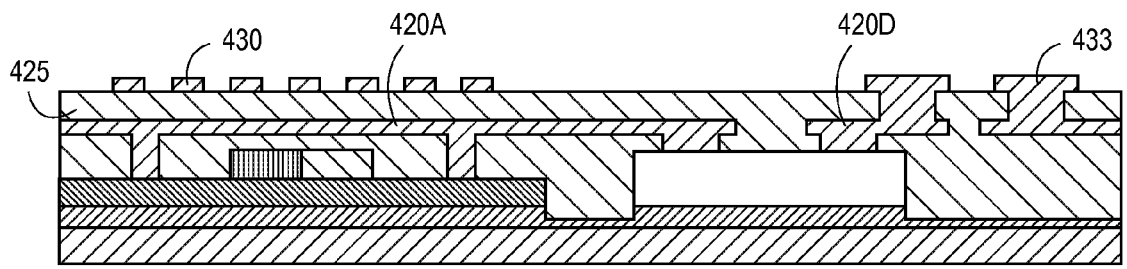

At operation 310 the IC chip is placed on a holder suitable as a support during film lamination, for example in FIG. 4A the IC chip 405 is placed onto a holder 407. Generally, the holder 407 is a temporary handle and may be a metal, such as, but not limited to Cu. The IC chip 405 may be affixed to the holder 407 in any of the number of manners known in the art (e.g., adhesive, etc.). Also at operation 310, a thin substrate 409, such as but not limited to a silicon substrate, thinned to a thickness that will serve to planarize structures disposed on the substrate 409 with a top surface of the IC chip 405, is disposed on the holder 407. A magnet 410 is then disposed on the substrate 409. Alternatively, the magnet 410 may be pre-assembled onto the substrate 409.

Continuing with the method 301, at operation 315 a dielectric build-up layer, such as ABF, or an ABF-like organic dielectric film, is laminated over the magnet and the IC chip. As further depicted in FIG. 4B, the ABF 415 is laminated over the magnet 410 and IC chip 405, embedding them both. The method 301 continues with operation 320 where features are patterned into the dielectric build-up layer. For example, via openings are patterned using conventional BBUL techniques known in the art. A first metallization layer, such as but not limited to Cu, is then deposited into the vias using any conventional deposition techniques such as, but not limited to, electroplating. As further shown in FIG. 4C, the metallization layer 420 includes a coil structure 420A, vias as anchors 420B, interconnects 420C between the anchor 420B and the IC 405, as well as redistribution layer (RDL) traces 420D.

Returning to FIG. 3, the method 301 proceeds with laminating another dielectric build-up layer over the first metallization layer at operation 325. In the exemplary embodiment shown in FIG. 4D, the ABF 425 is laminated over each of the coil structure 420A, anchors 420B, interconnects 420C between the anchor 420B and the IC 405, as well as redistribution layer (RDL) traces 420D. Continuing with the method 301 at operation 330, a protection metallization structure is plated over the coil structure. As further shown in FIG. 4E, a second level of metallization is utilized to form a protective mesh 430 (anchored at many locations not occupied by the coil structure 420A). The same metallization forms bump or solder ball pads 433 connected to the RDL trances 420D.

Figure 4F:
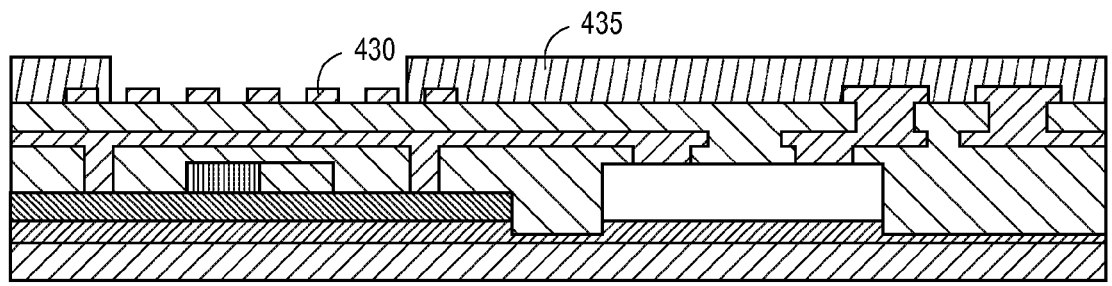
Figure 4G:
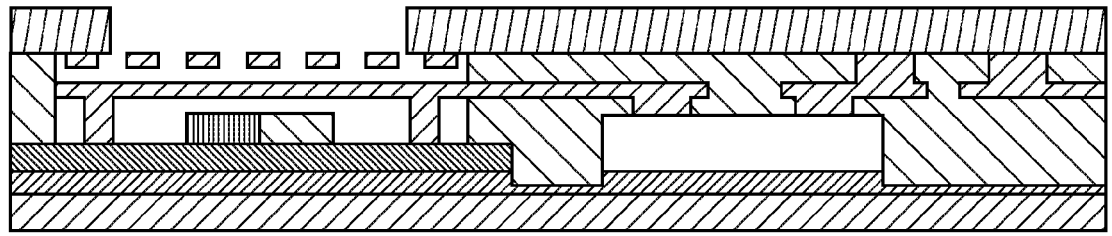
Figure 4H:
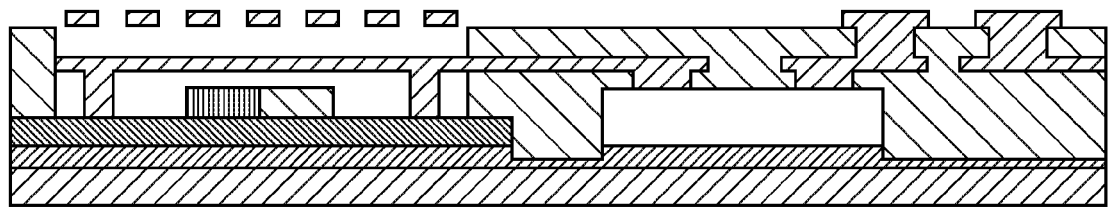
Figure 4I:
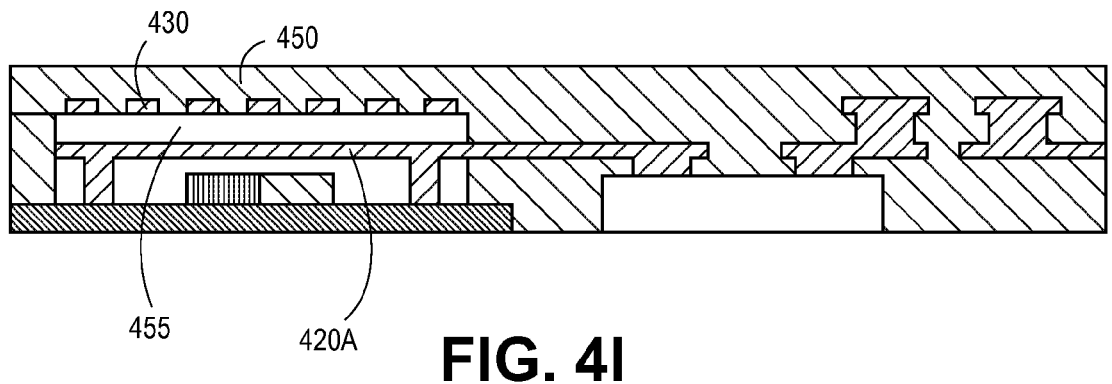

A resist layer is then applied and patterned (e.g., using a mask) to expose the protection metallization (and coil) regions at operation 335, and as further depicted in FIG. 4F, with the resist layer 435 opened over the protective mesh 430. An etch process is then employed at operation 340 (FIG. 4), such as, but not limited to a plasma oxygen-based etch (ash) to release at least one coil structure (e.g., forming a cavity around a drive coil.). FIG. 4G further illustrates the coil structure 420A, anchors 420B, and magnet 410 are all exposed by the selective etch operation 340. The resist is then stripped, as shown in FIG. 4H, and the method 301 proceeds with operation 350 where a dielectric film 450 is laminated over the released coil with the protection metallization ensuring a cavity 455 is formed around the coil structure 420A, anchors 420B, magnet 410, etc. With both the IC chip 405 and the inductive gyroscope components now completely embedded with the build-up layers, the holder may now be removed at operation 360, as further illustrated in FIG. 4I. The method 301 may then continue with conventional processing to complete assembly of the integrated inertial sensor (e.g., with solder ball attach process, etc.).

Embodiments of the present invention include operation of inductive gyroscopes. FIGS. 5 and 6 are flow diagrams illustrating methods 501 and 601 of determining an angular rate of rotation with an inductive gyroscope, in accordance with embodiments of the invention. In certain such embodiments, the operations in the methods 501 and 601 are performed by an integrated inertial sensor comprising at least one IC chip and an inductive gyroscope. In further embodiments, the integrated inertial sensor may be provided within one BBUL package as described elsewhere herein.

For the method 501, at operation 505 a time varying current is driven through a coil disposed over a magnet and released from its substrate in such a manner so as to vibrate in a first dimension relative an IC package in which the coil is disposed. The source of the drive current may be from an IC within the same IC package as the coil, or provided by an external source, for example routed to the coil through RDL in the IC package in which the coil is disposed. At operation 510, first and second time varying voltage signals are generated from the vibrating coil with a pair of sense coils through mutual induction. The first and second coils are disposed with the same IC package as the vibrating coil, and may be further positioned with respect to the vibrating coil in the manner described in FIGS. 1A-1B, for example, so that the time varying signals deviate from each other as a function of an angular velocity experienced by the IC package (e.g., in a second dimension orthogonal to the first). At operation 515, at least one of a yaw, pitch, or roll of the packaged IC (and therefore the mobile device in which the packaged IC is disposed) is determined based on the time varying voltage signals output from the first and second coils. In embodiments, rotation calculator circuitry determining the yaw, pitch, or roll is disposed on an IC within the same IC package as that of the vibrating coil.

The method 501 may further include determining a second of the yaw, pitch, or roll based on third and fourth time varying signals where the packaged IC further includes an additional pair of coils and a second magnet oriented in second dimension, as described elsewhere herein. Similarly, the method 501 may further include determining a third of the yaw, pitch, or roll based on fifth and sixth time varying signals where the packaged IC further includes an additional pair of coils and a third magnet oriented with respect to the first and second magnets, as described elsewhere herein.

Referring now to FIG. 6, the method 601 begins at operation 605, which like operation 505, entails driving a time varying current through a coil disposed over a magnet and released from its substrate in such a manner so as to vibrate in a first dimension relative an IC package in which the coil is disposed. The source of the drive current may be from an IC within the same IC package as the coil, or provided by an external source, for example routed to the coil through RDL in the IC package in which the coil is disposed. At operation 610, a signal is generated across a second pair of conductive coil anchors in the LC loop formed by a portion of the vibrating coil and a capacitor coupled across the second pair of coil anchors, for example as described in the context of FIG. 2A. This signal is sensed and its frequency measured to determine the resonance frequency of the LC circuit. At operation 615, a self-inductance (or a change thereof) of springs within the second pair of coil anchors is determined from the resonance frequency and at operation 620, an angular velocity is determined from the self-inductance determination. In one embodiment, the self-inductance determination and angular velocity determinations are performed by an IC disposed within the same IC package as the vibrating coil. From the self-inductance determination, a compression or extension of a spring within the second anchors corresponding to the determined self inductance may further be determined. An angular velocity may then be determined from the amount of spring compression or extension. The method 601 may then further include a determination of at least one of a yaw, pitch, or roll of the packaged IC (and therefore of the mobile device in which the packaged IC is disposed) based on one or more of resonance frequency, and/or spring compression or extension, and/or angular velocity.

Figure 7:
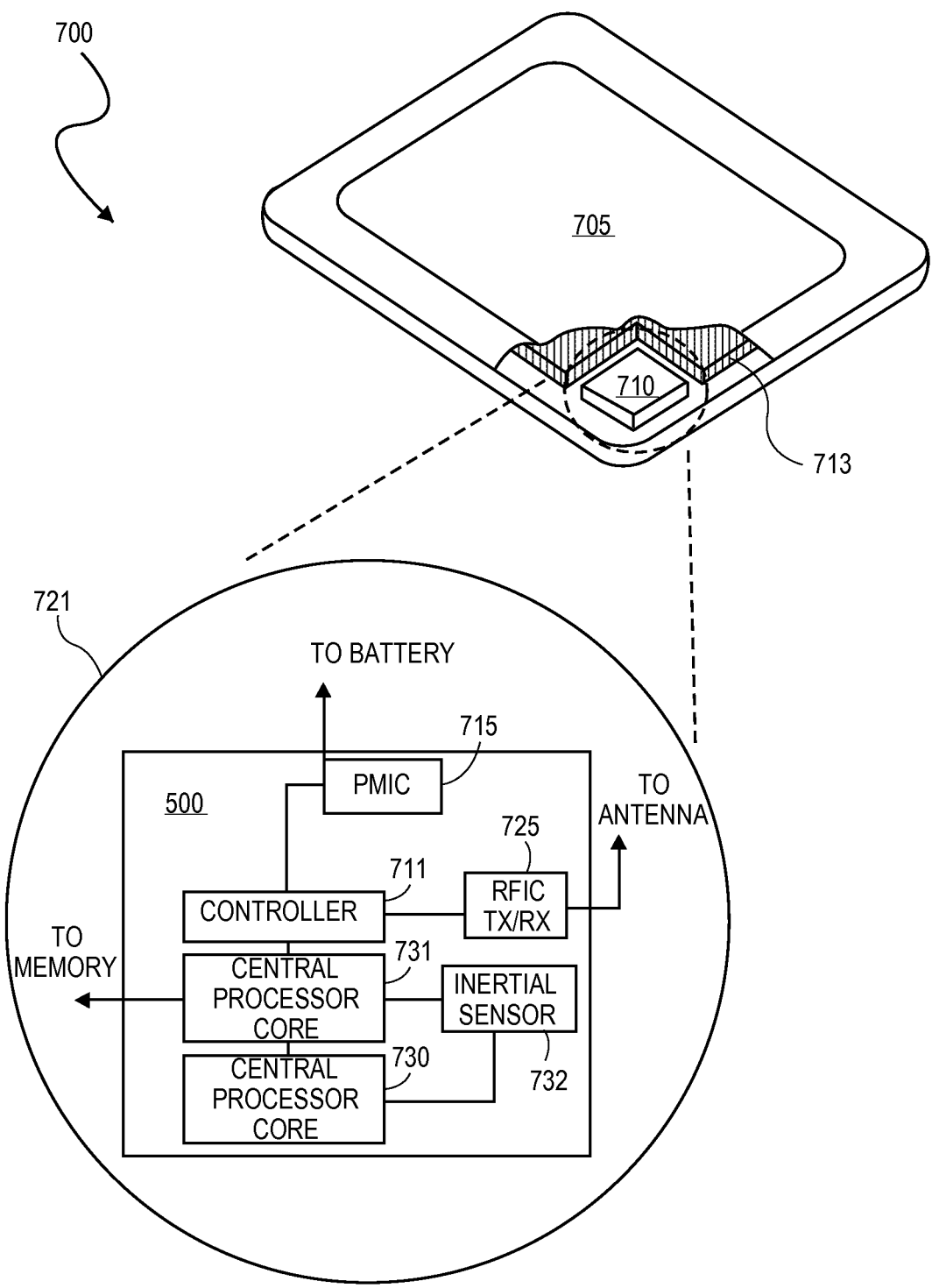
FIG. 7 illustrates isometric and expanded views of a mobile computing platform including an inductive inertia sensor, in accordance with an embodiment.

FIG. 7 illustrates an isometric view of a computing device platform 700 and schematic view 721 of a microelectronic device 710 employed by the platform, in accordance with an embodiment of the present invention. The computing platform 700 may be any portable device configured for each of electronic data display, electronic data processing, and wireless electronic data transmission. For exemplary mobile embodiments, the computing platform 700 may be any of a tablet, a smart phone, laptop or ultrabook computer, etc., and include a display screen 705 that may be a touchscreen (capacitive, inductive, resistive, etc.), a chip-level (SoC) or package-level integrated microelectronic device 710, and a battery 713.

The integrated device 710 is further illustrated in the expanded view 721. In the exemplary embodiment, the device 710 includes at least one memory chip and at least one processor chip (e.g., a multi-core microprocessor and/or graphics processor cores 730, 731). In embodiments, an integrated inertial sensor 732 including an inductive gyroscope, for example as described in more detail elsewhere herein (e.g., FIGS. 1A, 1B, 2A, etc.), is integrated into the device 710. The device 710 is further coupled to the board, substrate, or interposer 500 along with, one or more of a power management integrated circuit (PMIC) 715, RF (wireless) integrated circuit (RFIC) 725 including a wideband RF (wireless) transmitter and/or receiver (e.g., including a digital baseband and an analog front end module further comprising a power amplifier on a transmit path and a low noise amplifier on a receive path), and a controller thereof 711. Functionally, the PMIC 715 performs battery power regulation, DC-to-DC conversion, etc., and so has an input coupled to the battery 713 and with an output providing a current supply to all the other functional modules. As further illustrated, in the exemplary embodiment the RFIC 725 has an output coupled to an antenna to provide to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. In implementations, each of these modules may be integrated onto a single chip as an SoC, onto separate ICs coupled to a package substrate of the packaged device 710, or at a board level.

Figure 8:
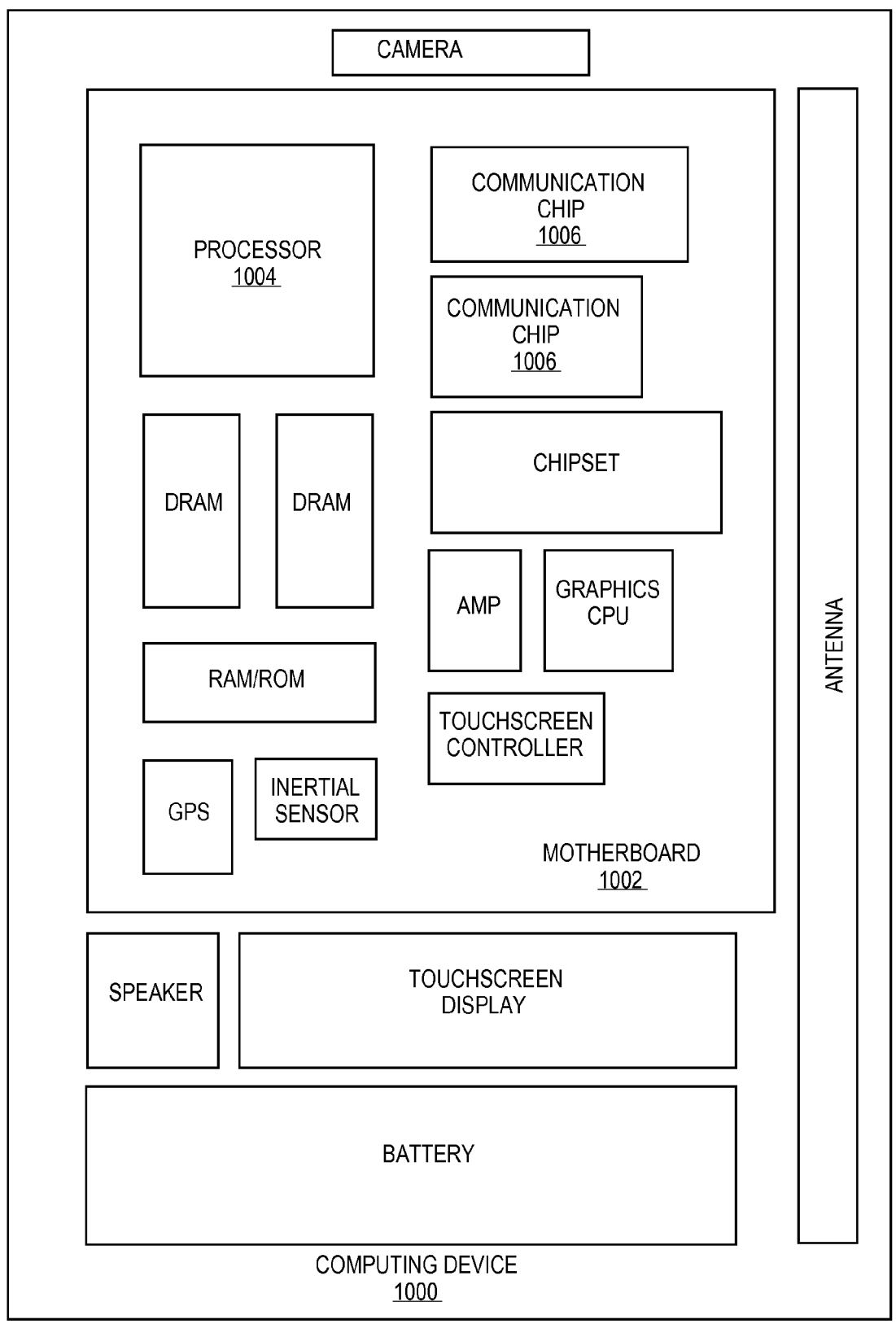
FIG. 8 illustrates a computing device in accordance with one implementation of the invention.

FIG. 8 is a functional block diagram of a computing device 1000 in accordance with one embodiment of the invention. The computing device 1000 may be found inside the platform 700, for example, and further includes a board 1002 hosting a number of components, such as but not limited to a processor 1004 (e.g., an applications processor) and at least one communication chip 1006. In embodiments, at least the processor 1004 is integrated (e.g., in-package) with an inertial sensor in accordance with embodiments described elsewhere herein. The processor 1004 is physically and electrically coupled to the board 1002. The processor 1004 includes an integrated circuit die packaged within the processor where the term "processor" may refer to any device or portion of a device that processes electronic data from registers and/or memory to transform that electronic data into other electronic data that may be stored in registers and/or memory.

In some implementations the at least one communication chip 1006 is also physically and electrically coupled to the board 1002. In further implementations, the communication chip 1006 is part of the processor 1004. Depending on its applications, computing device 1000 may include other components that may or may not be physically and electrically coupled to the board 1002. These other components include, but are not limited to, volatile memory (e.g., DRAM), non-volatile memory (e.g., RAM or ROM) in the form of flash memory or STTM, etc., a graphics processor, a digital signal processor, a crypto processor, a chipset, an antenna, touchscreen display, touchscreen controller, battery, audio codec, video codec, power amplifier, global positioning system (GPS) device, integrated inertial sensor, accelerometer, speaker, camera, and mass storage device (such as hard disk drive, solid state drive (SSD), compact disk (CD), digital versatile disk (DVD), and so forth).

At least one of the communication chips 1006 enables wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to those described elsewhere herein. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

It is to be understood that the above description is intended to be illustrative, and not restrictive. For example, while flow diagrams in the figures show a particular order of operations performed by certain embodiments of the invention, it should be understood that such order is not necessarily required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A gyroscope, comprising:
   a substrate including a magnet;
   a drive coil disposed over the substrate and within a magnetic field of the magnet to vibrate in a first dimension relative to the substrate as a function of a time varying current passing through the drive coil,
   at least one sense coil disposed over the substrate and positioned with respect to the drive coil to register an inductance that varies as a function of an angular velocity in a second dimension, orthogonal to the first dimension,
       wherein the first dimension is perpendicular to a plane of the substrate, wherein the magnetic field and the angular velocity are parallel to the plane of the substrate.

2. The gyroscope of claim 1, wherein the at least one sense coil comprises a pair of sense coils is to register a first and second mutual inductance that deviate from each other as a function of the angular velocity.

3. The gyroscope of claim 2, wherein the sense coils are disposed relative to the drive coil to register a differential in their mutual inductance in response to a displacement of the drive coil in a dimension other than the first dimension that is greater than a mutual inductance differential registered in response to displacement of the drive coil in the first dimension.

4. The gyroscope of claim 3, wherein the drive coil is planar in a plane parallel to the substrate and comprises four substantially orthogonal segments with a plurality of conductive anchors, and at least one pair of the conductive anchors providing terminals through which the time varying current is applied to the drive coil.

5. The gyroscope of claim 4, wherein the sense coils further comprise a first pair of sense coils having coil lengths parallel to segments on opposite sides of the drive coil extending along a first in-plane dimension to register a differential in mutual inductance in response to a displacement of the drive coil in a second in-plane dimension, orthogonal to the first in-plane dimension.

6. The gyroscope of claim 5, wherein the sense coils further comprise a second pair of sense coils having coil lengths parallel to segments on opposite sides of the drive coil extending along the second in-plane dimension, the second pair to register a differential in mutual inductance in response to a displacement of the drive coil in the first in-plane dimension.

7. The gyroscope of claim 2, wherein each of the pair of sense coils comprises at least one of:
 a spiral with a plurality of turns made within a same plane parallel to the substrate; or
 a plurality of coils disposed along a length of the drive coil and connected in series; or
 one or more turns in a plane parallel to the substrate but not in the same plane as the drive coil, the one or more turns disposed symmetrically over a segment of the drive coil.

8. An integrated inertial sensor, comprising:
 the gyroscope of claim 2; and
 at least one of an amplifier or rotation calculator downstream of the sense coils, the amplifier to amplify a voltage differential registered by the pair of sense coils and the rotation calculator to determine a rotation based on the voltage differential registered by the pair of sense coils.

9. The integrated inertial sensor of claim 8, wherein the amplifier or rotation calculator comprise circuitry on an integrated circuit (IC) chip disposed within a same package as the gyroscope.

10. The integrated inertial sensor of claim 8, wherein the drive and sense coils comprise at least one metallization layer disposed within organic dielectric build-up layers of the package.

11. A method of determining an angular rate of rotation of a mobile device including a packaged integrated circuit (IC), the method comprising:
 driving a time varying current through a first coil disposed within a first magnetic field of a first magnet embedded, along with the first coil, within the IC package dielectric to vibrate the first coil in a first dimension relative to the IC package;
 generating first and second time varying voltage signals with a pair of sense coils through mutual induction responsive to displacement of the first coil, the first and second time varying voltage signals deviating from each other as a function of an angular velocity in a second dimension, orthogonal to the first dimension; and
 determining a first of a yaw, pitch, or roll of the mobile device based on the first and second time varying voltage signals,
 wherein the first coil is planar in a plane parallel to a plane of the substrate and the first coil comprises four substantially orthogonal segments with a plurality of conductive anchors, and wherein the time varying current is driven through at least one pair of the conductive anchors.

12. The method of claim 11, further comprising:
 driving a time varying current through a second coil disposed within a second magnetic field, orthogonal to the first magnetic field to vibrate the second coil in the first dimension;
 generating third and fourth time varying voltage signals with a pair of sense coils through mutual induction responsive to displacement of the second coil, the third and fourth time varying voltage signals deviating from each other as a function of an angular velocity in a dimension orthogonal to the second dimension; and
 determining a second of a yaw, pitch, or roll of the mobile device based on the third and fourth time varying voltage signals.

13. A gyroscope, comprising:
 a substrate including a magnet;
 a drive coil disposed over the substrate and within a magnetic field of the magnet to vibrate in a first dimension relative to the substrate as a function of a time varying current passing through the drive coil,
 at least one sense coil disposed over the substrate and positioned with respect to the drive coil to register an inductance that varies as a function of an angular velocity in a second dimension, orthogonal to the first dimension,
  wherein the time varying current is driven through a first pair of conductive coil anchors, and wherein the sense coils include a second pair of conductive coil anchors and a portion of the coil disposed there between, the second pair of coil anchors registering self inductances that vary as a function of an angular velocity in a second dimension, orthogonal to the first dimension, and wherein a resonant frequency varies as a function of the self inductance and capacitance of a capacitor coupled across the second pair of coil anchors,
  wherein the first dimension is parallel to the plane of the substrate, wherein the magnetic field and the angular velocity are perpendicular to the plane of the substrate, and wherein the second pair of anchors comprise springs to compress and extend along the second dimension in a manner that changes their self inductance.

14. The gyroscope of claim 13, wherein the springs are rectangle springs having at least a pair of conductor segments extending in the first dimension and joined at one end by a short segment extending in the second dimension.

15. An integrated inertial sensor, comprising:
 the gyroscope of claim 13; and
 a rotation calculator downstream of the sense coils, the rotation calculator to determine a rotation based on the resonant frequency.

16. The integrated inertial sensor of claim 15, wherein the rotation calculator comprises circuitry on an integrated circuit (IC) chip disposed along with the gyroscope within a same package.

17. The integrated inertial sensor of claim 15, wherein the coil comprises at least one metallization layer disposed within organic dielectric build-up layers of the package.

* * * * *